United States Patent
Tiew

(10) Patent No.: US 8,894,452 B2
(45) Date of Patent: Nov. 25, 2014

(54) DRIVE MEANS FOR AMPHIBIOUS EQUIPMENT

(75) Inventor: Kim Boon Tiew, Johor (MY)

(73) Assignee: EIK Engineering SDN. BHD., Johor (MY)

( * ) Notice: Subject to any disclaimer, the term of this patent is extended or adjusted under 35 U.S.C. 154(b) by 131 days.

(21) Appl. No.: 13/811,794

(22) PCT Filed: Sep. 20, 2011

(86) PCT No.: PCT/MY2011/000208
§ 371 (c)(1),
(2), (4) Date: Jan. 23, 2013

(87) PCT Pub. No.: WO2012/039600
PCT Pub. Date: Mar. 29, 2012

(65) Prior Publication Data
US 2013/0130574 A1 May 23, 2013

(30) Foreign Application Priority Data

Sep. 21, 2010 (MY) ............................... 2010004398

(51) Int. Cl.
| | | |
|---|---|---|
| *B60F 3/00* | (2006.01) | |
| *B62D 55/125* | (2006.01) | |
| *B62D 55/27* | (2006.01) | |
| *B63H 19/08* | (2006.01) | |
| *B62D 55/00* | (2006.01) | |
| *B63H 1/34* | (2006.01) | |

(52) U.S. Cl.
CPC ................ *B60F 3/0015* (2013.01); *B60F 3/00* (2013.01); *B62D 55/125* (2013.01); *B62D 55/27* (2013.01); *B63H 19/08* (2013.01); *B62D 55/00* (2013.01); *B63H 1/34* (2013.01)

USPC ....... 440/5; 440/12.56; 440/12.63; 440/12.64

(58) Field of Classification Search
CPC ........ B63H 23/26; B63H 20/10; B63H 25/42; B63H 2001/344; B60F 3/0007; B60F 2301/04; B60F 3/0038; B60F 3/0015; F41H 7/00; B64C 35/00; B63B 35/34; B64F 2700/6261
USPC .................. 440/5, 12.5, 12.56, 12.63, 12.64; 114/292
See application file for complete search history.

(56) References Cited

U.S. PATENT DOCUMENTS

| | | |
|---|---|---|
| 3,842,785 A | 10/1974 | Rivet |
| 3,892,079 A | 7/1975 | Hirano et al. |
| 4,124,124 A | 11/1978 | Rivet |
| 4,817,554 A | 4/1989 | Prestenbach |

(Continued)

FOREIGN PATENT DOCUMENTS

WO  200509003  9/2005

*Primary Examiner* — Lars A Olson
(74) *Attorney, Agent, or Firm* — Preston Smirman; Smirman IP Law, PLLC

(57) ABSTRACT

Amphibious construction equipment comprising a working unit supported on a pair of elongate, parallel, buoyant pontoons (2) each of which carries a caterpillar track (3) driven by sprockets mounted on an axles (5), the axles (5) being positioned at or towards the ends of each pontoon (2) on its upper surface, wherein each axle (5) is driven by at least one hydraulic motor (4), all the motors (4) being powered by a single hydraulic pump (7), the motors (4) on each pontoon (2) being arranged such that they run synchronously as to both direction and rate but not necessarily in the same direction or at the same rate as the motors (4) on the other pontoon (2).

5 Claims, 4 Drawing Sheets

(56) References Cited

U.S. PATENT DOCUMENTS

| | | | |
|---|---|---|---|
| 5,361,211 | A | 11/1994 | Lee et al. |
| 6,482,053 | B1 | 11/2002 | Prestenbach |
| 2005/0014425 | A1 | 1/2005 | Wilson |

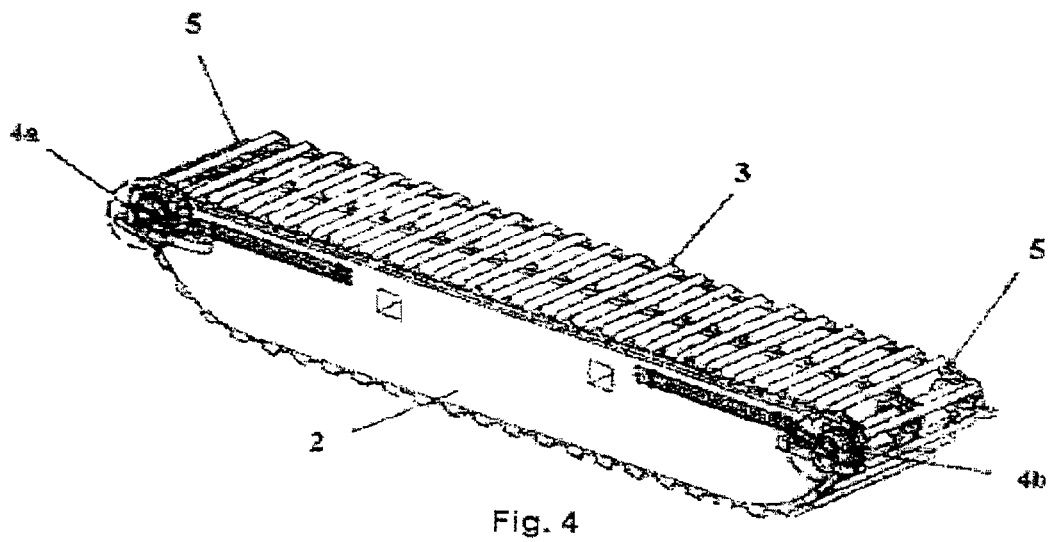
Fig. 4
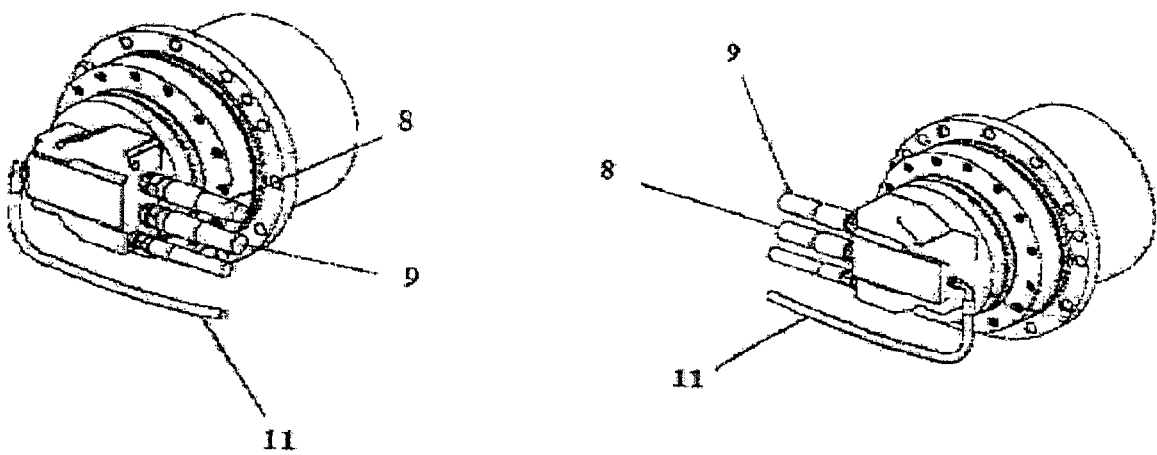
Fig. 5
Fig. 6

DRIVE MEANS FOR AMPHIBIOUS EQUIPMENT

CROSS-REFERENCE TO RELATED APPLICATION

The instant application is a national phase of PCT/MY2011/000208, filed Sep. 20, 2011, pending, which claims priority to Malaysian Patent Application No. PI 2010004398, filed Sep. 21, 2010, pending, the entire specifications of both of which are expressly incorporated herein by reference.

This invention relates to amphibious equipment and, more particularly, to amphibious equipment for use in the construction industry for excavating or lifting loads and other such operations on soft ground of on water and especially to the drive means for such equipment.

BACKGROUND TO THE INVENTION

Amphibious construction equipment such as excavators and cranes is increasingly being used for construction where ground conditions are such that conventional heavy equipment runs a risk of being bogged down, in some cases irretrievably. The currently used amphibious equipment is custom-built and comprises the operative part of whatever piece of equipment is desired mounted on a pair of buoyant caterpillar-tracked pontoons so that the structure will not sink into soft ground. Making the equipment amphibious also allows it to be used in waterfront sites where access is difficult.

The pontoons carry sprocket-driven caterpillar tracks that allow the equipment to be maneuvered on land or water, the track sprockets normally being driven by hydraulic motors. Each track usually has two or more spaced sprockets on a driven axle and two or more spaced sprockets on an idler axle. The asymmetrical distribution of torque and traction between the front axle and rear axles limit the track efficiency especially when operating on highly undulating and viscous surfaces. Another undesirable effect is that tracks and motor will deteriorate more quickly because the unbalanced stresses generated by the idler and driven axles will lead to inconsistent metal fatigue in different parts of the tracks, and reduced the motor lifespan.

The prior art contains various proposals related to the train drive system of amphibious machines.

US-2005/0014425-A discloses a drive system for use in amphibious excavators and draglines having caterpillar-type treads or tracks. The system has an adjustable sprocket and chain connected between a final drive of an engine and a track axle that moves endless belts carrying the tracks or treads to propel the machinery. The improved drive system described in this document has a sprocket attached to the final drive of the motor; a sprocket removably affixed to a track drive axle near or at an end thereof, and an endless chain connecting the motor drive sprocket and the track drive sprocket. The sprocket and chain drive system can be adjusted to change torque and speed by removing and replacing the track drive sprocket with greater diameter sprocket for more track force and lower speed or with a lesser diameter sprocket for less track force and higher speed.

The result is an amphibious excavator with an improved tracking system, which uses multiple drive sprockets to suite the terrain condition. The improved tracking system allows the possibilities of sacrificing speed for torque and vice versa. Whilst allowing for different torque settings, the problems of motor and track deterioration and of inefficient torque to traction conversion are not addressed.

EP-1727687-B1 discloses an amphibious excavator which has a power transmission arrangement in the pontoon crawler track assembly, comprising an endless power transmission means in each of its pontoon members, such as chain formed by pin joints of successive formed parts that is arranged to be moveable by means of a wheel arrangement, such as a drive wheel and turnover wheel and/or support wheel arrangement or the like, on the outer periphery of the pontoon member, whereby each successive crawler track part of the crawler track arrangement is attached to the endless power transmission means. The pontoon crawler track assembly comprises a power transmission arrangement, essentially at the centre of each pontoon member, whereby each crawler track part of the arrangement is coupled with the power transmission means at its middle. The power transmission arrangement also comprises a chain tightening arrangement.

This document also fails to address the problems of motor and track deterioration and of inefficient torque to traction conversion.

One standard hydraulic drive train of existing amphibious construction equipment is powered by two hydraulic pumps. Each pump provides hydraulic pressure to a hydraulic motor on each side of a chassis. It also comprises a pair of parallel pontoons surrounded by a caterpillar track travelling round the periphery of each pontoon. The pressure from the hydraulic pumps is transferred to the hydraulic motors via fluid connections to provide power to two of the axles. The other two axles are idlers.

Other conventional amphibious equipment utilizes a single hydraulic motor in the drive train. Whether single of dual hydraulic motors are used they are selected based on the weight of the equipment. Higher capacity equipment requires more power for its operation and the only current solution is to employ either more powerful engines or bigger hydraulic motors. This correlation ultimately limits the range of motion of the upper structure or the mobility of the equipment depending on the placement of the motor.

This invention circumvents the various problems of amphibious construction equipment referred to hereinbefore.

SUMMARY OF THE INVENTION

According to the invention drive means for amphibious equipment comprising a working unit supported on a pair of elongate, parallel, buoyant pontoons each of which carries a caterpillar track driven by sprockets mounted on an axles, the axles being positioned at or towards the ends of each pontoon on its upper surface, comprise a single hydraulic pump, at least one hydraulic motor powered by the pump for driving each axle, the motors on each pontoon being arranged such that they run synchronously as to both direction and rate but not necessarily in the same direction or at the same rate as the motors on the other pontoon.

The invention also includes amphibious equipment incorporating the drive system. Preferably the drive system of the invention incorporates a controller that automatically controls valves in the lines connecting the motors to the hydraulic pump to ensure that each pair of motors is accurately controlled as to its direction and rate.

BRIEF DESCRIPTION OF THE DRAWINGS

The invention will now be described in greater detail, by way of example, with reference to the drawings, in which:

FIG. 4 is a perspective view of a single pontoon of the excavator shown in FIG. 1 showing the relative positions of the hydraulic motors and the pontoon;

FIG. 5 is an enlarged view of one of the hydraulic motors of FIG. 4; and

FIG. 6 is an enlarged view of the other hydraulic motor of FIG. 4.

DESCRIPTION OF PREFERRED EMBODIMENTS

Figure 1:
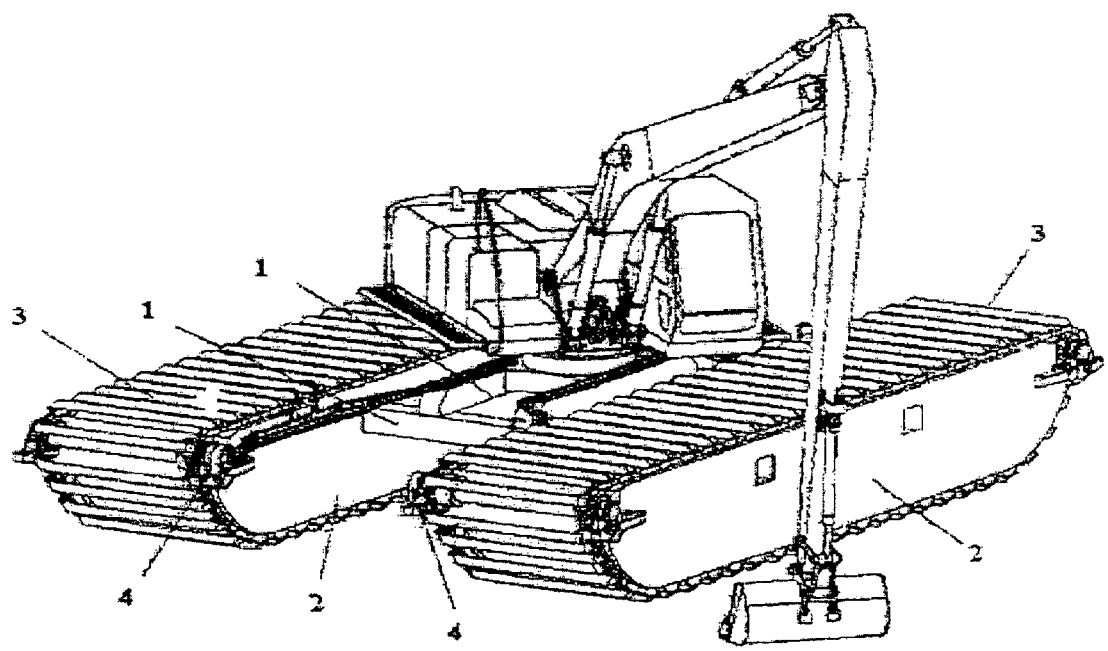
FIG. 1 is a perspective view of an amphibious excavator of the present invention.
Figure 2:
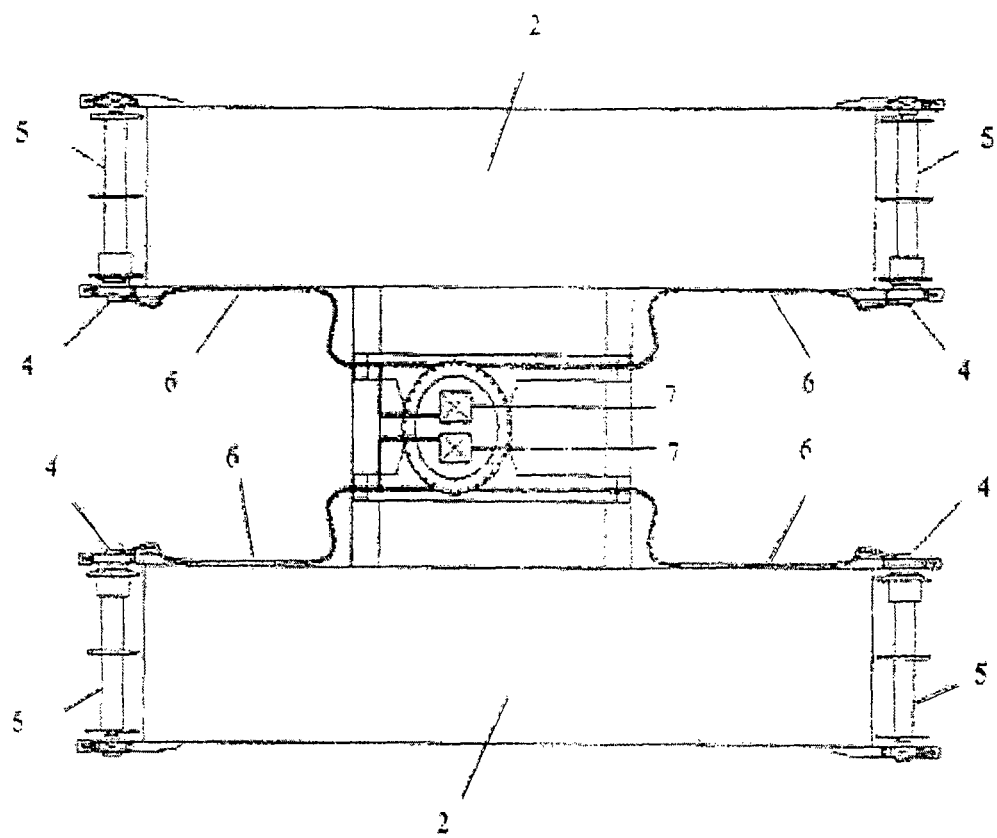
FIG. 2 is a schematic top view of the chassis of the excavator shown in FIG. 1.

Referring to FIGS. 1 and 2, an amphibious excavator comprises a chassis (1), a pair of parallel pontoon members (2) coupled to said chassis (1), an axle (5) mounted at opposing ends of each pontoon member (2) on the top surface thereof, a sprocket (5a) mounted at each end of axle (5), a caterpillar track (3) around the outer periphery of each pontoon member (2) and engaging with sprockets (5a), whereby the caterpillar track (3) moves around pontoon (2) on rotation of axles (5), and a hydraulic motor (4) for driving each axle (5) and connected by fluid connections (6) to a hydraulic pump (7).

Figure 3:
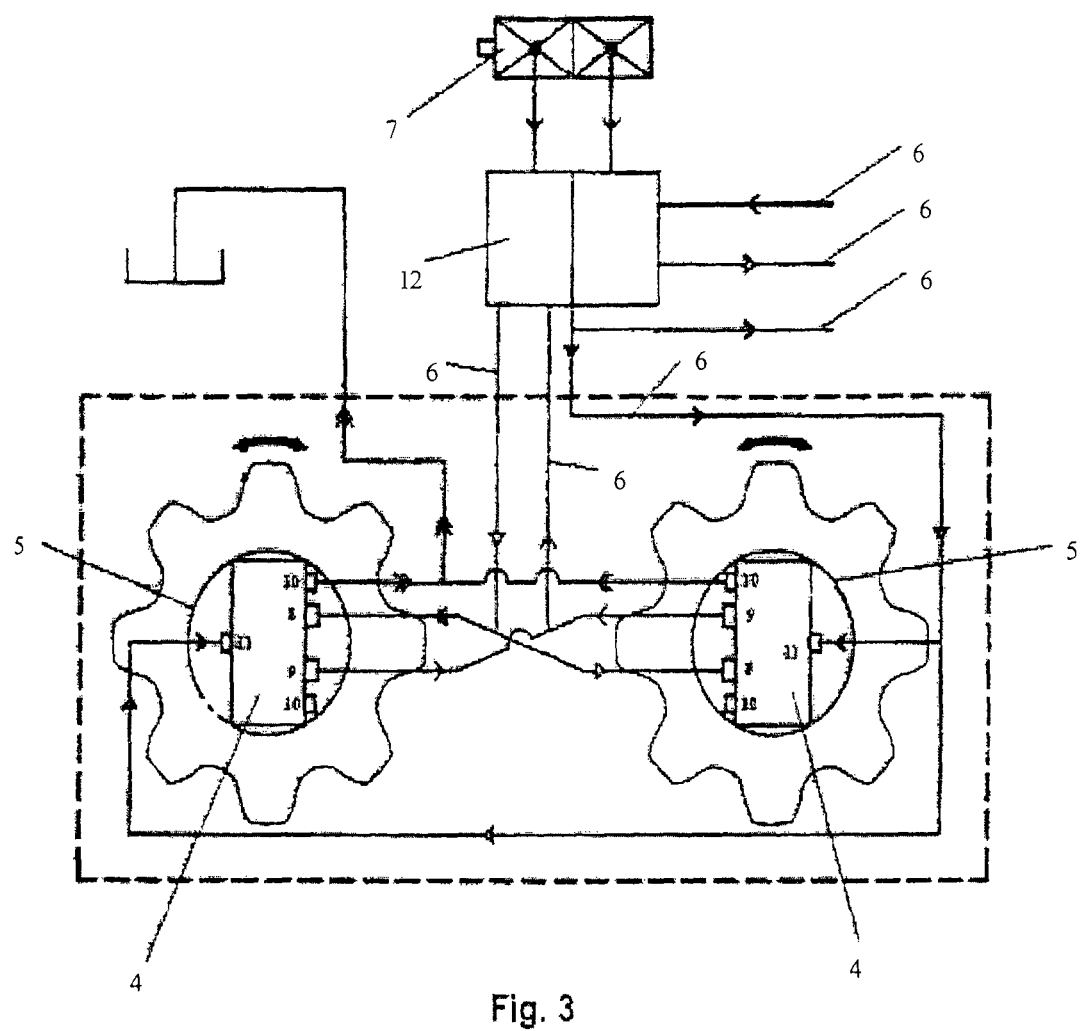
FIG. 3 is a diagram of the hydraulic fluid distribution system of the excavator shown in FIG. 1.

FIG. 3 is a schematic diagram of the hydraulic distribution system comprising hydraulic pump (7) which powers the two hydraulic motors (4) on each side. The fluid connection (6) comprises a plurality of hydraulic lines to complete the hydraulic cycle from pump (7), through motors (4) and back to pump (7).

One of the motors (4b) is mounted upside down to achieve synchronization of rotation direction of the two motors (4a, 4b) and the hydraulic lines cross each other to connect them to the relevant ports (8 & 9). Hydraulic lines connect the ports that drive the motors for forward movement while another hydraulic line connects the ports that drive the motors for reverse movement. FIG. 3 also shows the flow of the hydraulic pressure from pump (7) to the hydraulic motors (4). The pressure is routed through the control valve (12) depending on the direction of movement desired. As can be seen, all of the axles (5) are powered and there is no idle axle.

FIG. 4 shows the structure of one of the pontoon members (2) in greater detail comprising a continuous track (2). The axles (5) carrying the sprockets that engage the continuous tracks (3) are driven by two hydraulic motors (4a and 4b).

FIGS. 5 and 6 are enlarged views of the two motors (4a, 4b), respectively, on each pontoon. One motor is mounted upside down compared to the other. Ports (8) are used as input ports when the drive is to move the machine in one direction and ports (9) are used as input ports when the drive is to move the machine in the other direction. The pairs of ports (8a, 8b) and (9a, 9b), as shown in FIG. 3, are each connected to the output from controller (12) by individual lines (6). Port (11) is used to control the speed of the motors and to ensure that they operate at the same speed.

The invention claimed is:

1. Drive means for amphibious equipment, comprising:
a working unit supported on a pair of elongate, parallel, buoyant pontoons each of which carries a caterpillar track driven by sprockets mounted on axles;
the axles being positioned at or towards the ends of each pontoon on its upper surface;
a single hydraulic pump;
at least one hydraulic motor powered by the pump for driving each axle;
the motors being arranged on each pontoon such that one of the motors is mounted upside down so that they run synchronously as to both direction and rate but not necessarily in the same direction or at the same rate as the motors on the other pontoon; and
a controller that controls valves in lines connecting the motors to the hydraulic pump to ensure that each pair of motors is controlled as to its direction and rate.

2. Amphibious equipment, comprising:
a working unit supported on a pair of elongate, parallel, buoyant pontoons each of which carries a caterpillar track driven by sprockets mounted on axles;
the axles being positioned at or towards the ends of each pontoon on its upper surface, wherein each axle is driven by at least one hydraulic motor, all the motors being powered by a single hydraulic pump;
the motors being arranged on each pontoon such that one of the motors is mounted upside down so that they run synchronously as to both direction and rate but not necessarily in the same direction or at the same rate as the motors on the other pontoon; and
a controller that controls valves in lines connecting the motors to the hydraulic pump to ensure that each pair of motors is controlled as to its direction and rate.

3. Amphibious equipment according to claim 2, wherein the working unit is an excavator.

4. Amphibious equipment according to claim 2, wherein the working unit is a crane.

5. Amphibious equipment according to claim 2, wherein the working unit is a bulldozer.

* * * * *